(12) United States Patent
Wang et al.

(10) Patent No.: US 12,028,317 B2
(45) Date of Patent: *Jul. 2, 2024

(54) SYSTEMS AND METHODS FOR DYNAMIC FIREWALL POLICY CONFIGURATION

(71) Applicant: Level 3 Communications, LLC, Broomfield, CO (US)

(72) Inventors: Jin-Gen Wang, Lafayette, CO (US); Travis D. Ewert, Highlands Ranch, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,962

(22) Filed: Sep. 29, 2023

(65) Prior Publication Data

US 2024/0031331 A1   Jan. 25, 2024

Related U.S. Application Data

(63) Continuation of application No. 17/966,805, filed on Oct. 15, 2022, now Pat. No. 11,777,901, which is a continuation of application No. 17/011,133, filed on Sep. 3, 2020, now Pat. No. 11,477,162, which is a continuation of application No. 16/653,882, filed on Oct. 15, 2019, now Pat. No. 10,771,432, which is a continuation of application No. 15/440,335, filed on Feb. 23, 2017, now Pat. No. 10,462,104.

(60) Provisional application No. 62/301,392, filed on Feb. 29, 2016.

(51) Int. Cl.
*H04L 9/40* (2022.01)
*H04L 41/08* (2022.01)
*H04L 41/0869* (2022.01)
*H04L 41/0893* (2022.01)

(52) U.S. Cl.
CPC ...... *H04L 63/0227* (2013.01); *H04L 41/0869* (2013.01); *H04L 41/0886* (2013.01); *H04L 41/0893* (2013.01); *H04L 63/0272* (2013.01)

(58) Field of Classification Search
CPC ............ H04L 63/0227; H04L 41/0869; H04L 41/0886; H04L 41/0893
USPC ........................................................ 726/14
See application file for complete search history.

(56) References Cited

U.S. PATENT DOCUMENTS

| 7,328,451 | B2 | 2/2008 | Aaron | |
|---|---|---|---|---|
| 8,914,868 | B2* | 12/2014 | Anantharamiah | .. H04L 63/0227 370/254 |
| 2006/0041935 | A1* | 2/2006 | Conley | ............... H04L 63/0227 726/11 |
| 2007/0044156 | A1* | 2/2007 | Redmann | ............ H04L 41/0869 726/25 |

(Continued)

OTHER PUBLICATIONS

International Preliminary Report on Patentability, dated Sep. 4, 2018, Intl Appl. No. PCT/US17/019049, Intl Filing Date Feb. 23, 2017; 6 pgs.

(Continued)

*Primary Examiner* — Teshome Hailu

(57) ABSTRACT

Systems and methods for receiving information on network firewall policy configurations are disclosed. Based on the received firewall configuration information, a configuration of a firewall and/or subnet of network devices is automatically provisioned and/or configured to control network traffic to and from the subnet.

6 Claims, 4 Drawing Sheets

(56) References Cited

U.S. PATENT DOCUMENTS

| | | | | |
|---|---|---|---|---|
| 2010/0319065 | A1* | 12/2010 | Hansson | H04L 63/0263 |
| | | | | 726/14 |
| 2010/0333165 | A1* | 12/2010 | Basak | H04L 63/0218 |
| | | | | 726/1 |
| 2013/0019277 | A1 | 1/2013 | Chang | |
| 2014/0304776 | A1* | 10/2014 | Strebe | H04L 63/1458 |
| | | | | 726/3 |
| 2016/0350549 | A1* | 12/2016 | Hampel | G06F 21/6218 |
| 2017/0250951 | A1 | 8/2017 | Wang et al. | |
| 2020/0045017 | A1 | 2/2020 | Wang | |
| 2020/0403971 | A1 | 12/2020 | Wang | |

OTHER PUBLICATIONS

International Search Report dated May 5, 2017, Int'l Appl. No. PCT/US17/019049, Int'l Filing Date Feb. 23, 2017; 3 pgs.

Written Opinion of the International Searching Authority dated May 5, 2017, Int'l Appl. No. PCT/US17/019049, Int'l Filing Date Feb. 23, 2017; 4 pgs.

* cited by examiner

SYSTEMS AND METHODS FOR DYNAMIC FIREWALL POLICY CONFIGURATION

TECHNICAL FIELD

Aspects of the present disclosure relate to telecommunication network technologies, and in particular, to a dynamic firewall controller for automatic firewall policy generation and configuration.

BACKGROUND

Firewalls are generally designed to block possibly harmful communications from reaching a computer in a network or entering the network itself, typically a private network. For example, a firewall may filter network and Internet traffic based upon the type of requesting traffic, the source/destination address of requesting traffic, and/or the port to which the traffic is directed. As another example, a firewall may examine each packet entering or leaving the network and accept or reject it based on user-defined rules.

When a new network or device is being provisioned, an associated firewall is usually manually configured to protect the network or device. Manual configuration of firewalls is a highly-technical task that can involve many steps, is often confusing to inexperienced installers, and can be expensive. Further, manual configuration of firewalls inhibits companies from offering real-time dynamic network services.

It is with these problems in mind, among others, that various aspects of the present disclosure were conceived.

SUMMARY

Aspects of the present disclosure involve systems, methods, and non-transitory computer readable mediums for firewall configuration. The methods, systems, and/or computer-readable mediums include receiving input defining a firewall policy for a firewall managing access to a subnet of network components deployed within a communications network, the firewall policy including a configuration for the firewall and a network component configuration of a component of the subnet of network components. The methods, systems, and/or computer-readable mediums further include processing the input to automatically implement the configurations at at least one of the firewall and at least one network component of the subnet of network components. The methods, systems, and/or computer-readable mediums include deploying the firewall within the communications network according to the firewall policy to manage traffic to and from the subnet.

BRIEF DESCRIPTION OF THE FIGURES

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Aspects of the present disclosure involve a firewall controller that dynamically configures and automatically applies firewalls in a network in order to control network data traffic to and from devices in the network. Generally speaking, a firewall is an appliance (a dedicated combination of hardware and software) running on a device that performs other functions. The firewall is designed to control the flow of network traffic (e.g., Internet Protocol (IP) traffic) to or from a network. Typically, firewalls are used to examine network traffic and enforce firewall "policies" based on rules contained within a ruleset of the firewall. For example, firewalls are often used to combat malicious activities and assaults on computing resources and network-accessible information. A firewall policy represents as set of rules and/or instructions that identify how a firewall should behave. In some instances, a firewall may implement a policy with a set of rules, and in other instances, a firewall may implement a set of policies that are highly complex involving thousands of rules. In the telecommunication services context, firewall policies may further describe network traffic behaviors based upon business needs. Polices articulate both what network traffic is to be controlled and how such traffic is to be controlled.

In various embodiments, the dynamic firewall controller automatically manages and allocates policies of the firewall, such that the system is flexible and efficient. Initially, the dynamic firewall controller may provide access to an initial set of network "services" corresponding to a particular customer, via a web portal, interactive interface(s), graphical-user interface(s), and/or the like (referred to herein as "Portal"). Generally speaking, a network "service" represents a discrete piece of functionality that performs or otherwise implements a particular network function. Such functions may include data center services, Ethernet, managed dedicated fiber(s), private line(s), secure internet services, virtual private LANs, among others. In some embodiments, each network function may be or otherwise involve a standardized interface that is implemented independent of the underlying functionality and/or data. Customers may interact with the Portal to initiate a request to the dynamic firewall controller that defines and implements firewall policies.

Figure 1:
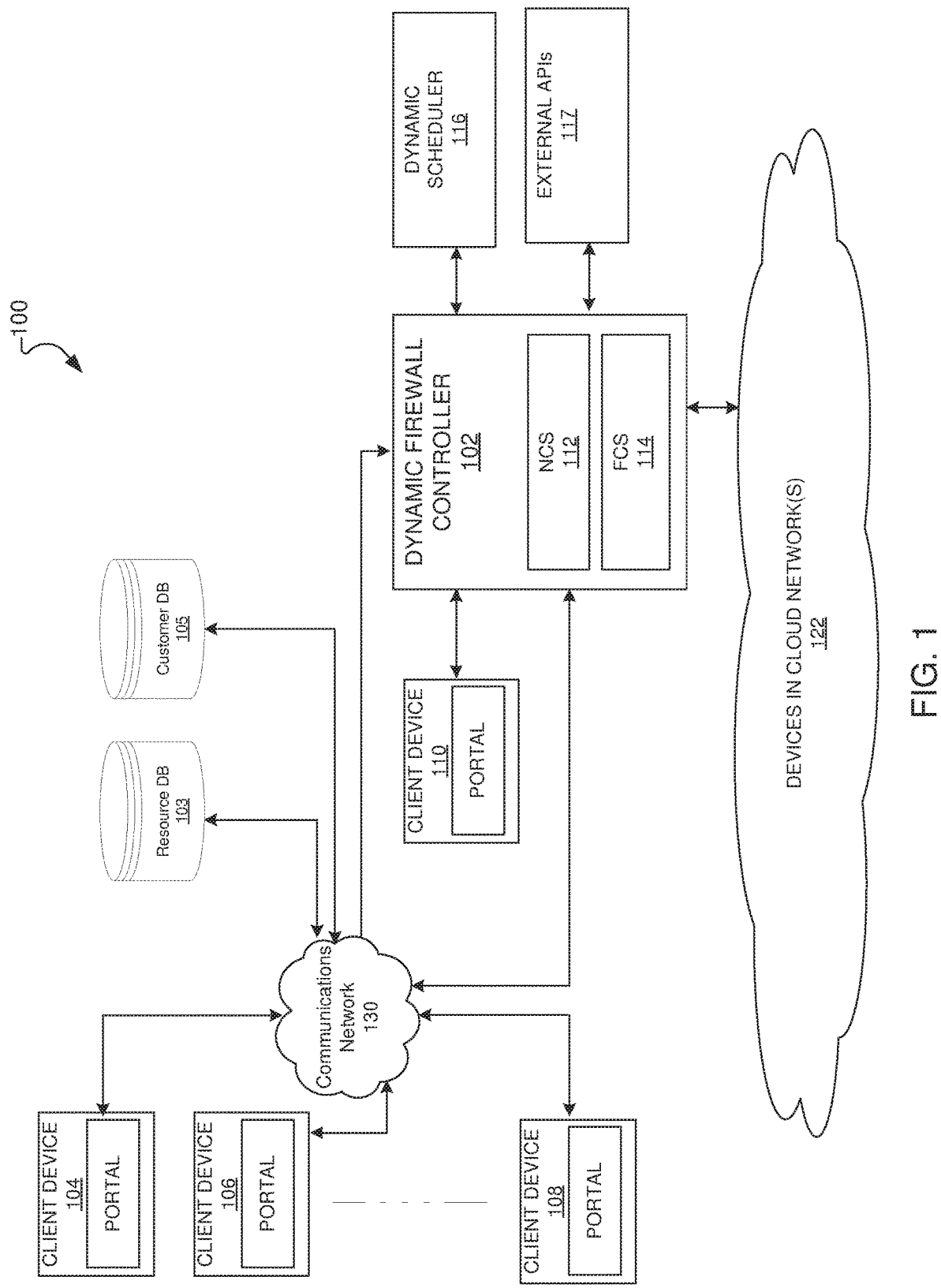
FIG. 1 is a block diagram illustrating a computing network for dynamically configuring firewall policies, according to aspects of the present disclosure.

FIG. 1 illustrates an example computing network 100 for dynamically configuring and automatically applying firewall policies to manage network data traffic, according to one embodiment. The computing network 100 may be an IP-based telecommunications network, the Internet, an intranet, a local area network, a wireless local network, a content distribution network, or any other type of communications network, as well as combinations of networks. For example, in one particular embodiment, the network 100 may be a telecommunications network including fiber-optic paths between various network elements, such as servers, switches, routers, and/or other optical telecommunications network devices that interconnect to enable receiving and transmitting of information between the various elements as well as users of the network.

The computing network 100 includes a dynamic firewall controller 102, which may be a processing device that functionally connects (e.g., using communications network 100) to one or more client devices 104-110 included within the computing network 100. A user interested in defining a firewall policy may interact with one or more client device(s) 104-110 to initiate a request, which may be received by dynamic firewall controller 102. More particularly, the one or more client device(s) 104-110 may also include a user interface, such as a browser application, to generate a request for dynamically configuring firewalls and/or firewall policies. In response, the dynamic controller 102 may transmit instructions that may be processed and/or executed to generate, or otherwise display, a Portal for defining the firewall policies and/or configuring firewalls. The one or more client devices 104-110 may be any of, or any combination of, a personal computer; handheld computer; mobile phone; digital assistant; smart phone; server; application; and the like. In one embodiment, each of the one or more client devices 104-110 may include a processor-based platform that operates on any suitable operating system, such as Microsoft® Windows®, Linux®, and/or the like that is capable of executing software.

In some embodiments, firewall configurations and policies, accessible and definable through the Portal may be driven by a resource database 103 and/or a customer database 105. Stated differently, the resource database 103 may store firewall polices as database records having fields that reference specific firewall configurations. Accordingly, the resource database 103 may store or otherwise maintain configurations for specific network services corresponding to a particular customer currently receiving services from a telecommunication service provider and for which a firewall is required. Stated differently, the resources database 103 and/or the customer database 105 stores information identifying specific customers and the specific network services they are currently being consumed by a customer from the telecommunications service provider. For example, the customer database 105 may contain information uniquely identifying customer A. The resource database 103 may include information (capable of being cross-referenced with the customer data in the customer database 105) indicating that a customer "A" is currently purchasing two network services including: 1) data center services that enable 24/7 secure data access to proprietary content and media; and 2) content delivery services that provide the proprietary content to users. Thus, the resource database 103 stores information that identifies customer A, as well as information that articulates the specific configurations for the data center services and content delivery services, including any initial firewall policy configurations required to effectively and securely provide the services.

In one embodiment, the resources database 103 may further include information required to configure subnets, such as an internet protocol address, an Internet protocol subnet mask, an internet protocol default gateway, a domain name system (DNS) server, and a dynamic host configuration protocol (DHCP) server. A subnet is a network of computing devices that is part of a larger network, such as the Internet. For example, a subnet may include all the computing devices of a particular organization that are maintained in a certain geographic location, or all of the computing devices of the particular organization that are in the same local area network (i.e., the subnet). Having a subnet allows the organization to access the Internet with a single shared network address.

Referring generally again to FIG. 1, the dynamic firewall controller 102 may process any input defining firewall policies passed from the Portal to the dynamic firewall controller 102 and automatically configure various aspects of a firewall. The dynamic firewall controller 102 may also take threat inputs from threat intelligence systems (e.g., the "reputation" system at Level (3)®), dynamically generate proper firewall policies, and automatically configure the firewall polices for customers who subscribe to threat protection service. More specifically, the dynamic firewall controller 102 may automatically make one or more application programming interface ("API") calls to a network configuration systems engine ("NCS") 112 and/or a firewall configuration system engine ("FCS") 114. The NCS 112 includes logic for configuring various aspects of the routers and switches of a subnet (or otherwise) that may require configuration in accordance with the firewall policy. For example, if the firewall policy involves a subnet, the firewall policy may include configurations for router that defines an Address, network ID, subnet ID, subnet mask, and the like, any of which may be needed to manage network traffic to and from the subnet. In other embodiments, the NCS 112 may configure firewall devices directly.

The FCS 114 includes logic for configuring various aspects of any firewalls that require configuration. Accordingly, the APIs include or otherwise define various routines and protocols for performing various activities at the NCS 112 and the FCS 114 to configure firewalls of the devices in the clouds, or other networks 122 (illustrated as devices in cloud network(s) 122). In some embodiments, the dynamic firewall controller 102 may queue any requests received to define and/or otherwise configure a firewall policy in a dynamic scheduler 116. For example, if a customer is interested in only implementing a firewall policy for a given period of time, or interested in implementing a firewall policy at, or for, a specific period of time (e.g., a time window during which the firewall policy is applicable), the requests may be maintained in a queue at the dynamic scheduler 116 and automatically passed to the dynamic firewall controller 102 at the appropriate time for processing.

Figure 2:
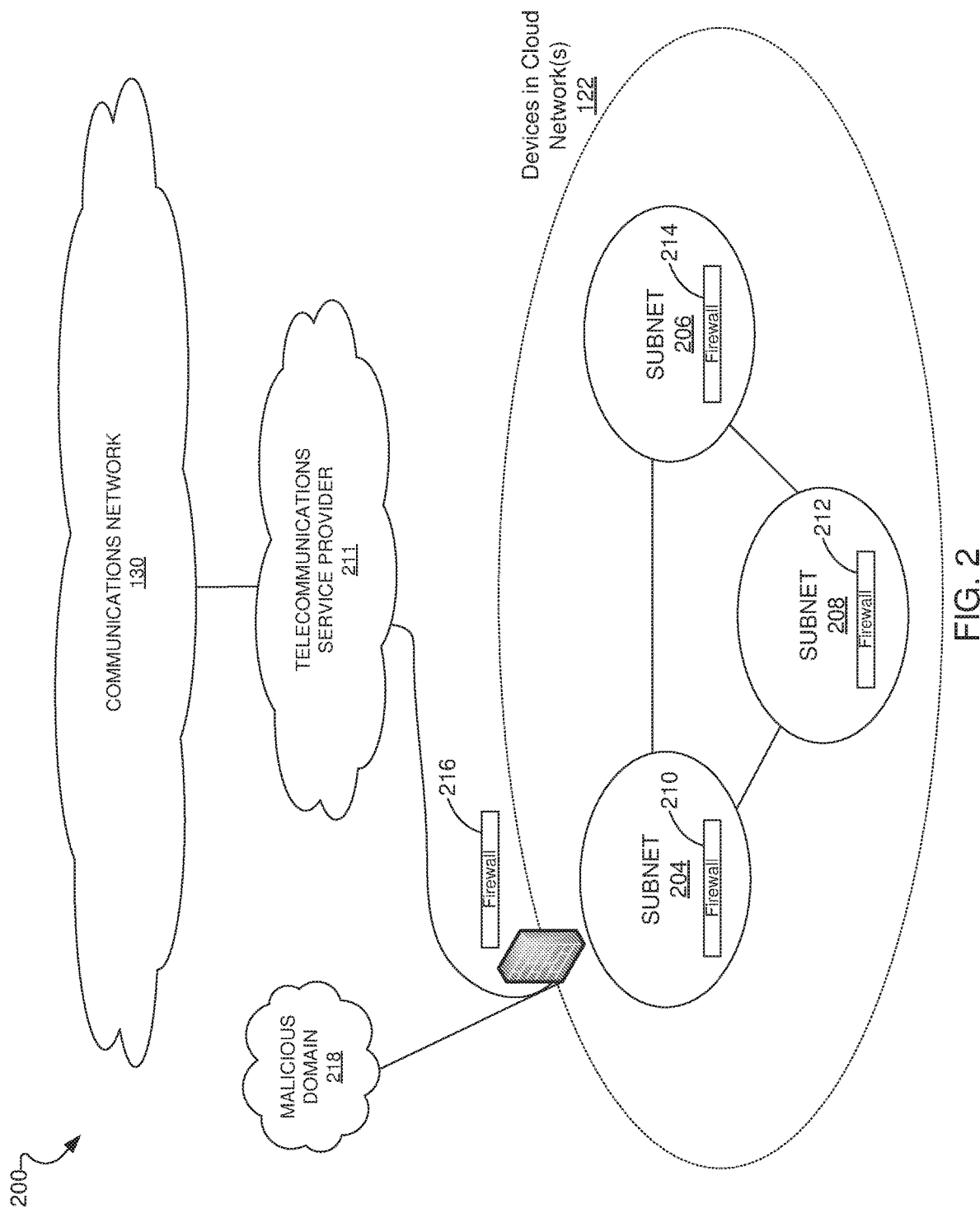
FIG. 2 is another block diagram of a computing network for dynamically configuring firewall policies, according to aspects of the present disclosure.

FIG. 2 provides an illustrative example of a cloud computing network 200 containing devices for which firewall policies may be defined and implemented to control to network data traffic, according to one embodiment. The illustrated embodiment will be described in the context of a telecommunication service provider providing network services to a business enterprise referred to as a "customer". Assume a customer has three branch locations: one in Denver, Colorado, one in Chicago, Illinois, and one in New York City, New York. In the illustrated embodiment, the branches are configured into multiple and separate subnets 204, 206, and 208 with firewall protections 210, 212, 214, and 216. To enable communication between the various subnets 204, 206, and 208, the customer purchased VPN services and Ethernet from the telecommunications service provider 211. Each subnet 204, 206, and 208, includes firewall(s) to manage network traffic between the subnets 204, 206, and 208. For example, the subnet 204 may correspond to the customer's human resources computing systems (e.g., hardware and/or software), the subnet 206 may correspond to the customer's engineering computing resources, and the subnet 208 may correspond to the customer's customer sales data and management computing resources.

At some point, the customer may want to implement a firewall policy (e.g., network layer policies) that describes network traffic behaviors between the subnets 204, 206, and 208, based upon business needs of the customer. For example, the customer may want to implement a firewall policy that states that subnet 206 corresponding to the engineering office and related computing systems should not access resources of subnet 204 corresponding to the customer's human resources and computing systems. Stated differently, the customer may implement a firewall policy that blocks network traffic from subnet 206 to subnet 204 or otherwise limits traffic by specifying a limited set of connections. As another example, the resources with each subnet 204, 206, and 208 may be equipped to detect threats and other malicious activity for network traffic coming from a particular domain, external to the subnets, such as a malicious domain 218. Upon detection of the threat and/or malicious activity, the customer may want to be able to dynamically implement a firewall policy that blocks all network traffic coming from the domain. Alternatively, the customer may implement a firewall policy that re-routes the detected traffic to a predetermined network, such as a honeynet, for analysis or other actions. To manage such firewall configurations, the customer may interact with the client devices 104-110 (illustrated in FIG. 1) to access the Portal and provide firewall policy configurations to the dynamic firewall controller 102. For example, the customer may interact with the client devices 104-110 to implement configurations that automatically block traffic from the malicious domain.

Figure 3:
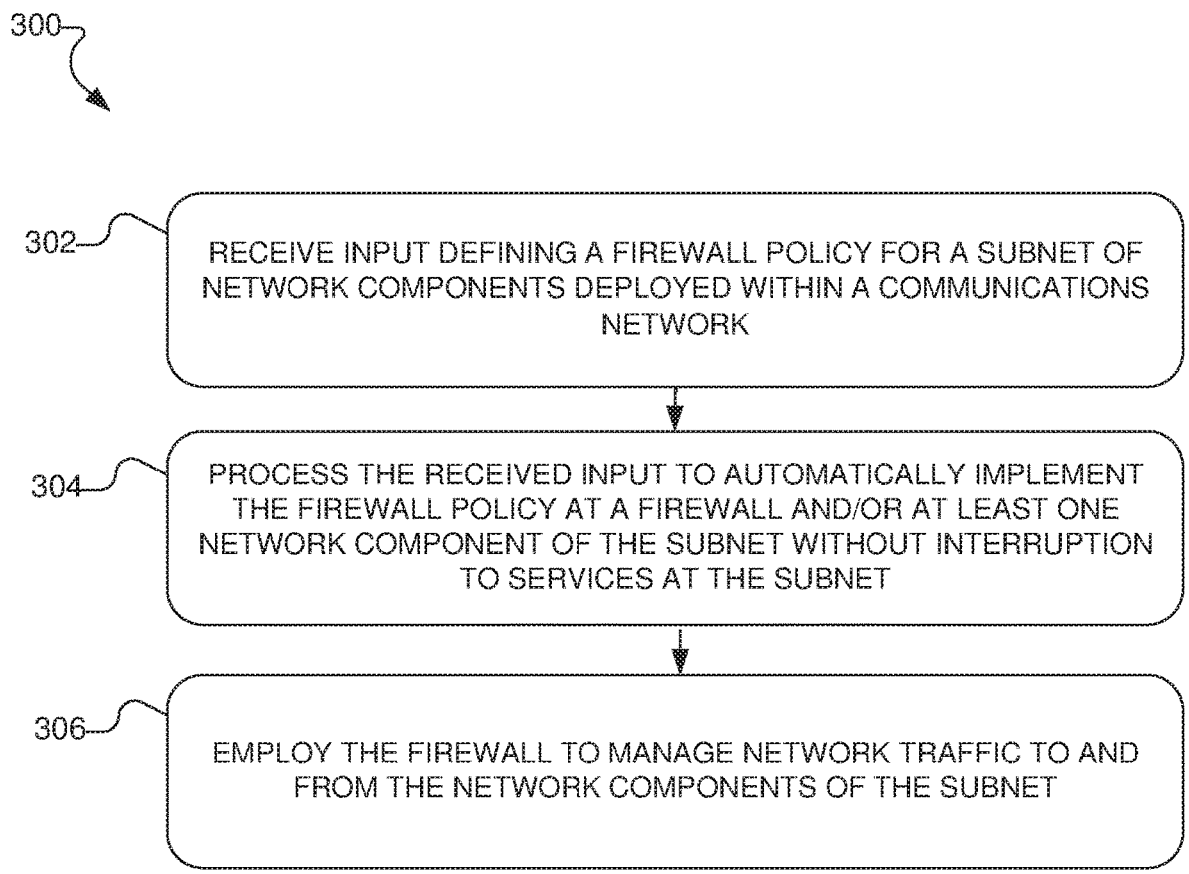
FIG. 3 is a flowchart illustrating an example process and/or method for dynamically configuring firewall policies, according to aspects of the present disclosure.

Referring now to FIG. 3 and with reference to FIG. 1, an illustrative process 300 to dynamically configure and automatically apply firewall policies to manage network data traffic is provided. As illustrated, process 300 begins with receiving input defining a firewall policy for a subnet of network devices currently deployed within a communications network (operation 302). Referring to FIG. 1, a graphical user-interface, accessible through a browser at a client device, may be generated, initialized, or otherwise in communication with the dynamic firewall controller 102. Subsequently, the dynamic firewall controller 102 may access the customer information that identifies one or more of the network services and corresponding computing components currently being provided to the customer and integrate such information within the graphical user-interface, along with any current or available firewall configurations. The graphical user-interface may be provided for display to the one or more client devices 104-110. Stated differently, the graphical user-interface may provide various components, buttons, menus, and/or other functions to help the user identify configurations for various network and/or telecommunication services currently being provided to the customer and thereby allow the customer to provide input defining the firewall policy. In some embodiments, referring to FIG. 1, external APIs 117 provided by the dynamic firewall controller 102 may be used by customers or other applications to trigger firewall policy change inputs.

In various embodiments, a user may provide input for a firewall policy that relates to one or more ports, communication protocols, or services, among other alternatives that describe how network traffic may be managed. For example, such input may include one or more source IP addresses, destination IP addresses, source ports, destination ports, and/or protocols that may be used to match/filter incoming traffic. In a specific example, the firewall policy may require a particular port be blocked. The firewall policy may open a specific series of ports to enable various computing components of a subnet to communicate with a network service using the ports. As yet another example, the firewall policy may block a port, adjust a communication protocol, apply one or more security settings, enable or disable a service, or any combination thereof. The policies and configurations may be applicable to a network, such as a subnet, or a network device for a particular period of time.

In other embodiments, the NCS 112 and/or the FCS 114 may detect environment changes within a subnet (e.g., changes resulting from one or more devices being connected/disconnected or upgraded) and dynamically update the firewall configuration based on the detected environment changes.

Referring again to FIG. 3, the received input is automatically processed to implement the policy at a firewall(s) and/or corresponding network components of the subnet without interruption to the various devices within the subnet and/or without telecommunication service interruption at the subnet (or elsewhere) (operation 304). Referring to FIG. 1, the input is provided to the NCS 112 and/or the FCS 114, either of which automatically implement the configurations at the various devices corresponding to a customer. In one embodiment, the dynamic firewall controller 102 makes application programming interface ("API") calls to the NCS 112 and/or the FCS 114 to push firewall policies to various network elements included in the subnet. In other embodiments, the NCS 112 and/or the FCS 114 may automatically invoke specific processes that correspond to specific network elements and/or devices included within the subnet to configure firewall policies.

In some embodiments, before implementing the firewall policy changes, the configurations included in the policy may be validated and/or otherwise verified against erroneous and/or illogical automatic configuration changes based on the type changes being made to a particular subnet and/or devices within the subnet. For example, the NCS 112 may perform so-called "dry runs" to check and validate proposed firewall policy changes against a set of known rules without making actual changes on network elements. Stated differently, during a dry-run, the NCS 112 may execute instructions which, under normal circumstances, would implement permanent firewall policy changes to the network elements and/or devices. However, during the dry-run, no changes are actually implemented at the network elements. Instead, data corresponding to the execution of the firewall policy change instructions is captured and analyzed to validate that the proposed firewall policy changes would be implemented as expected at the network elements and/or devices of the subnet. In other embodiments, the NCS 112 may execute the proposed firewall policy changes against replicated virtual devices to simulate the changes in a virtual environment. More specifically, a virtual environment that includes the same network elements of the subnet, all of which emulate the function of the devices in the subnet may be provisioned. Subsequently, the proposed firewall policy changes may be executed by the NCS 112 and within the virtual environment to determine how the proposed changes would affect the network elements and/or devices and overall subnet. Under either circumstance, the proposed firewall policy changes may be validated before being implemented at applicable network elements and/or network devices.

Referring again to FIG. 3, the newly configured firewall is initialized and/or activated in accordance with the new configurations and subsequently used to manage network traffic to and from the network components of the subnet (operation 306). More specifically, the dynamic firewall controller automatically begins to manage network traffic to and from the subnets 204, 206 and 208 to ensure network traffic is in compliance with the updated firewall policy.

Figure 4:
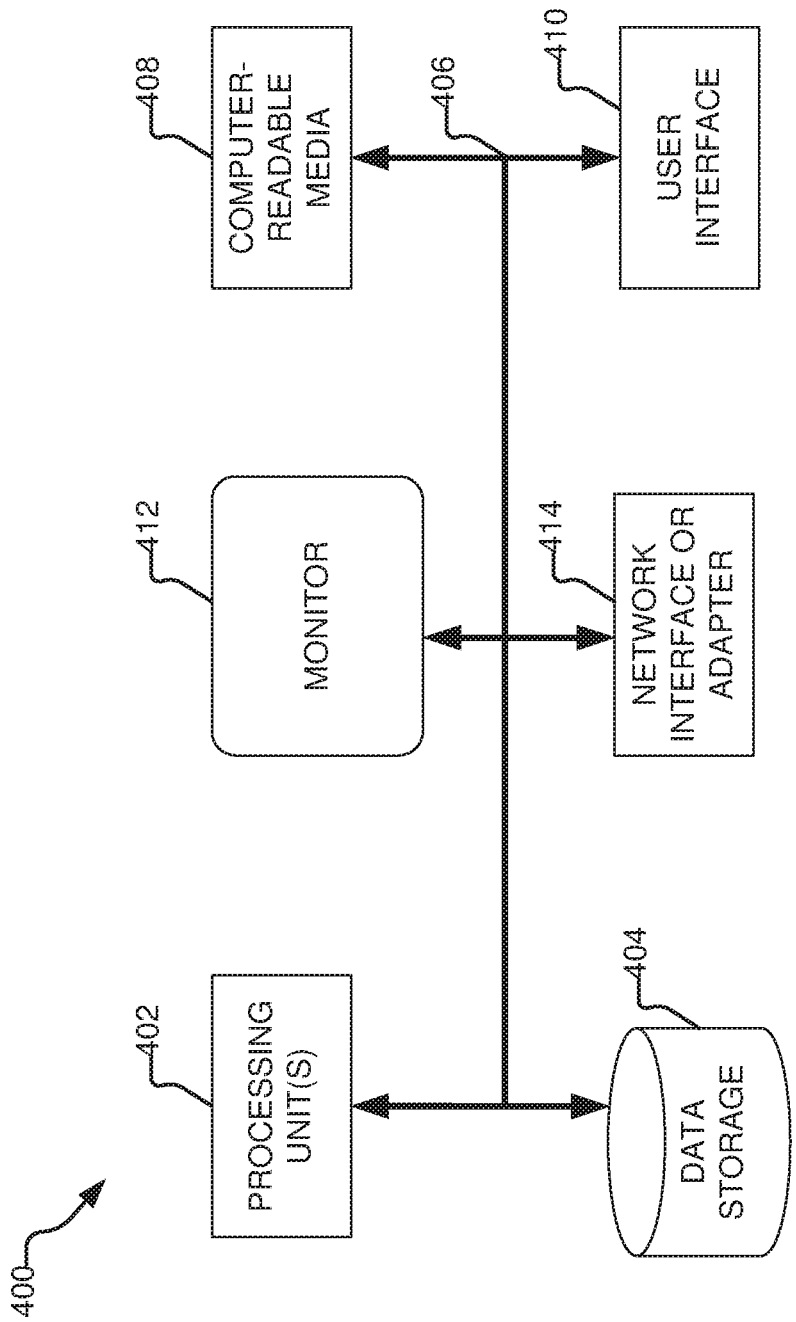
FIG. 4 is a block diagram illustrating a computing device for dynamically configuring firewall policies, according to aspects of the present disclosure.

FIG. 4 illustrates an example of a suitable computing and networking environment 400 that may be used to implement various aspects of the present disclosure described in FIG. 1-3. As illustrated, the computing and networking environment 400 includes a general purpose computing device 400, although it is contemplated that the networking environment 400 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 400 may include various hardware components, such as a processing unit 402, a data storage 404 (e.g., a system memory), and a system bus 406 that couples various system components of the computer 400 to the processing unit 402. The system bus 406 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 400 may further include a variety of computer-readable media 408 that includes removable/non-removable media and volatile/nonvolatile media, but excludes transitory propagated signals. Computer-readable media 408 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 400. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 404 includes computer storage media in the form of volatile/nonvolatile memory such as read only memory (ROM) and random access memory (RAM). A basic input/output system (BIOS), containing the basic routines that help to transfer information between elements within the computer 400 (e.g., during start-up) is typically stored in ROM. RAM typically contains data and/or program modules that are immediately accessible to and/or presently being operated on by processing unit 402. For example, in one embodiment, data storage 404 holds an operating system, application programs, and other program modules and program data.

Data storage 404 may also include other removable/non-removable, volatile/nonvolatile computer storage media. For example, data storage 404 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 4, provide storage of computer-readable instructions, data structures, program modules and other data for the computer 400.

A user may enter commands and information through a user interface 410 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 402 through a user interface 410 that is coupled to the system bus 406, but may be connected by other interface and bus structures, such as a parallel port, game port or a universal serial bus (USB). A monitor 412 or other type of display device is also connected to the system bus 406 via an interface, such as a video interface. The monitor 412 may also be integrated with a touch-screen panel or the like.

The computer 400 may operate in a networked or cloud-computing environment using logical connections of a network interface or adapter 414 to one or more remote devices, such as a remote computer. The remote computer may be a personal computer, a server, a router, a network PC, a peer device or other common network node, and typically includes many or all of the elements described above relative to the computer 400. The logical connections depicted in FIG. 4 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 400 may be connected to a public and/or private network through the network interface or adapter 414. In such embodiments, a modem or other means for establishing communications over the network is connected to the system bus 406 via the network interface or adapter 414 or other appropriate mechanism. A wireless networking component including an interface and antenna may be coupled through a suitable device such as an access point or peer computer to a network. In a networked environment, program modules depicted relative to the computer 400, or portions thereof, may be stored in the remote memory storage device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method for firewall configuration comprising:
   receiving, at a processing device, input defining a firewall policy for a firewall managing access to a subnet of network components deployed within a communications network, the firewall policy including a firewall configuration for the firewall and a network component configuration for a network component of the subnet of network components;
   executing, using the processing device and a virtual network component, first instructions associated with the firewall configuration;
   executing, using the processing device and the virtual network component, second instructions associated with the network component configuration;
   determining, based on the execution of the first instructions, that the firewall configuration is valid;
   determining, based on the execution of the second instructions, that the network component configuration is valid;
   automatically configuring, using the processing device, the firewall configuration at the firewall and the network component configuration at the network component in response to determining that the firewall configuration and the network component configuration are valid; and
   activating, using the processing device, the firewall within the communications network to manage traffic to and from the subnet, wherein
   the virtual network component is a replica of the network component, and
   the firewall policy is implemented at the firewall and the network component at a time associated with a user request.

2. The method of claim 1, wherein the firewall policy is implemented at the firewall and the network component for a specified period of time associated with a user request.

3. A system for firewall configuration comprising:
   a subnet of network components deployed within a communications network, the subnet accessible through a firewall;
   at least one processor; and
   non-transient computer-readable media communicably coupled to the at least one processor having instructions stored thereon that, when executed by the at least one processor, cause the at least one processor to:
   receive input defining a firewall policy for a firewall managing access to a subnet of network components deployed within a communications network, the firewall policy including a firewall configuration for the firewall and a network component configuration for a network component of the subnet of network components;
   execute, using a virtual network component, first instructions associated with the firewall configuration;
   execute, using the virtual network component, second instructions associated with the network component configuration;
   determine, based on the execution of the first instructions, that the firewall configuration is valid;
   determine, based on the execution of the second instructions, that the network component configuration is valid;
   automatically configure the firewall configuration at the firewall and the network component configuration at the network component in response to determining that the firewall configuration and the network component configuration are logically valid; and
   activate the firewall within the communications network to manage traffic to and from the subnet, wherein
   the virtual network component is a replica of the network component, and
   the firewall policy is implemented at the firewall and the network component at a time associated with a user request.

4. The system of claim 3, wherein the firewall policy is implemented at the firewall and the network component for a specified period of time associated with a user request.

5. A non-transitory computer-readable medium for firewall configuration including instructions, executable by a processor, the instructions comprising:
   receiving input defining a firewall policy for a firewall managing access to a subnet of network components deployed within a communications network, the firewall policy including a firewall configuration for the firewall and a network component configuration for a network component of the subnet of network components;
   executing, using a virtual network component, first instructions associated with the firewall configuration;
   executing, using the virtual network component, second instructions associated with the network component configuration;
   determining, based on the execution of the first instructions, that the firewall configuration is valid;
   determining, based on the execution of the second instructions, that the network component configuration is valid;
   automatically configuring the firewall configuration at the firewall and the network component configuration at the network component in response to determining that the firewall configuration and the network component configuration are logically valid; and
   activating the firewall within the communications network to manage traffic to and from the subnet, wherein
   the virtual network component is a replica of the network component, and
   the firewall policy is implemented at the firewall and the network component at a time associated with a user request.

6. The non-transitory computer-readable medium of claim 5, wherein the firewall policy is implemented at the firewall and the network component for a specified period of time associated with a user request.

* * * * *